(12) United States Patent
Boyer

(10) Patent No.: US 9,261,121 B2
(45) Date of Patent: *Feb. 16, 2016

(54) CHANNEL SIGN LENS SECURING SYSTEM

(71) Applicant: SignComp, LLC, Grand Rapids, MI (US)

(72) Inventor: Clyde H. Boyer, Concord, OH (US)

(73) Assignee: SignComp, LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/390,605

(22) PCT Filed: Feb. 5, 2013

(86) PCT No.: PCT/US2013/024748
§ 371 (c)(1),
(2) Date: Oct. 3, 2014

(87) PCT Pub. No.: WO2013/151615
PCT Pub. Date: Oct. 10, 2013

(65) Prior Publication Data
US 2015/0052711 A1    Feb. 26, 2015

Related U.S. Application Data

(60) Provisional application No. 61/619,510, filed on Apr. 3, 2012.

(51) Int. Cl.
*G09F 13/00* (2006.01)
*F16B 2/22* (2006.01)
(Continued)

(52) U.S. Cl.
CPC ... *F16B 2/22* (2013.01); *G09F 7/16* (2013.01); *G09F 7/18* (2013.01); *G09F 13/0404* (2013.01); *Y10T 24/44376* (2015.01); *Y10T 29/49826* (2015.01)

(58) Field of Classification Search
USPC .............. 24/291, 293, 295; 292/80–91, 303; 349/58
See application file for complete search history.

(56) References Cited

U.S. PATENT DOCUMENTS 1,697,501 A    1/1929 Gast
1,721,918 A    7/1929 Meyercord
(Continued)

FOREIGN PATENT DOCUMENTS

KR    1020110041077    4/2011
WO    2006006823    1/2006

OTHER PUBLICATIONS

International Search Report of the International Searching Authority from corresponding Patent Cooperation Treaty (PCT) Application No. PCT/US2013/024748, mailed Apr. 15, 2013.

*Primary Examiner* — Shin Kim
(74) *Attorney, Agent, or Firm* — Gardner, Linn, Burkhart & Flory, LLP

(57) ABSTRACT

A channel letter has a rear surface for mounting against a raceway, wall, or a structure for supporting the signage, and sheet metal sides defining the figuration of the letter or shape to be depicted. A lighting element is positioned against the rear surface of the enclosure, and a lens is retained to the open front of the enclosure. The lens is retained by a plurality of retainer clips. Each of the retainer clips has a first and a second side extending from an arched back with the sides spaced a distance sufficient for the sides to fit around the end of the walls.

22 Claims, 7 Drawing Sheets

(51) Int. Cl.
    *G09F 7/16*     (2006.01)
    *G09F 13/04*    (2006.01)
    *G09F 7/18*     (2006.01)

(56) References Cited

U.S. PATENT DOCUMENTS

| | | |
|---|---|---|
| 2,141,955 A | 12/1938 | Lang |
| 3,254,436 A | 6/1966 | Bank |
| 3,579,886 A | 5/1971 | Hughes |
| 3,760,552 A | 9/1973 | Skoetsch |
| 3,988,846 A | 11/1976 | Kuhling |
| 4,024,658 A | 5/1977 | Hoerner |
| 4,097,632 A | 6/1978 | Minogue et al. |
| 4,796,170 A | 1/1989 | Pedersen et al. |
| 6,318,585 B1 | 11/2001 | Asagiri et al. |
| 6,478,686 B1 | 11/2002 | Chen |
| 6,481,132 B1 | 11/2002 | Grate et al. |
| 6,748,686 B2 | 6/2004 | Grate et al. |
| 7,096,638 B2 | 8/2006 | Osterland et al. |
| 7,181,875 B2 | 2/2007 | Lewis |
| 7,427,088 B1 | 9/2008 | Annerino et al. |
| 8,424,230 B2 | 4/2013 | Boyer |
| 8,434,251 B2 | 5/2013 | Lee et al. |
| 8,484,871 B2 | 7/2013 | Boyer |
| 8,701,319 B2 | 4/2014 | Boyer |
| 8,756,841 B2 | 6/2014 | Boyer |
| 2002/0104241 A1 | 8/2002 | Grate et al. |
| 2009/0145011 A1 | 6/2009 | Walton |

CHANNEL SIGN LENS SECURING SYSTEM

CROSS REFERENCE TO RELATED APPLICATIONS

The present application is a §371 national stage of International Application PCT/US2013/024748, filed Feb. 5, 2013, which claims the priority benefit of U.S. patent application Serial Ser. No. 61/619,510, filed Apr. 3, 2012, both of which are hereby incorporated herein by reference in their entireties.

FIELD

The present invention relates to channel letters of the type used to create signage and, in particular, to an improved retainer clip for retaining the trim cap and lens to the enclosure of a channel letter.

BACKGROUND

Channel letters are used to provide signage for buildings, shopping malls, and the like where it is desirable that the signage comprise illuminated letters or any other shapes that are easily seen, even at great distances, day or night. Each channel letter consists of an enclosure, usually a metal box, having a rear surface which is positioned against a raceway, or the wall of a building, on which the signage is mounted and a plurality of sides which define the figuration of a letter or number (or other shape) which make up a portion of the sign. A light source, such as a neon tube, LEDs, or other lighting mechanisms, can be positioned within the walls of the enclosure and attached to the rear surface to provide illumination for the letter or shape.

The light sources used in many existing channel letters are neon bulbs requiring high voltage power with transformers built into the metal enclosures. To prevent injury to those servicing such channels letters many municipalities require that such letters be inspected to ensure that they are adequately sealed using standards set by Underwriters Laboratories.

It is expected that relatively new technology in lighting sources will soon become the most prevalent for the manufacturers of channel letters. Specifically, low voltage LED type light sources have been developed which provide a very long lasting bright light without requiring the high voltage and transformers needed for neon lighting. It is expected that channel letters employing the new technology will not be required to meet the same standards set by Underwriters Laboratories for neon tubes.

In addition to the lighting, a channel letter also includes a planar transparent lens, the outer shape of which corresponds to the figuration of the letter or any other shape defined by the sides of the enclosure. The manufacture of the lens requires that the planar panel of transparent plastic be cut to the shape of the enclosure. The lens of existing channel letters have a trim cap glued or welded to the outer edges thereof which form a border to the lens. The trim cap also has a lip which, when assembled to the enclosure, is shaped to fit snugly around the forward ends of the walls thereof for retaining the lens to the enclosure and to maintain the water tight seal required by Underwriters Laboratories. Screws are threaded through the lips of the trim cap and into the enclosure walls to retain the lens across the forward opening of the enclosure.

It would be desirable to provide a channel letter assembly having a lens and trim cap which could be installed without incurring the labor intensive step of attaching the trim cap with screws. It would also be desirable to provide a less cumbersome method of disassembling the trim cap and lens to gain access to the interior of the enclosure of a channel letter.

SUMMARY

Briefly, the present invention is embodied in a channel letter. For the purposes of this description, a channel letter is defined as an illuminated contoured fixture in the shape of a letter of the alphabet, a numeral, an element of punctuation such as a comma, an exclamation point, or any other shape or form intended to constitute a portion of a sign advertisement or display.

The channel letter of the present invention has a rear surface for mounting against a raceway, a wall, or any other structure suitable for supporting the signage. The walls defining the figuration of the letter or shape to be depicted are made of sheet metal having a given thickness. A lighting element, such as a strip of LEDs according to the newly available technology or any other light source, is positioned against the rear surface of the enclosure to provide illumination therefore.

A channel letter comprising an enclosure having at least two opposing walls, wherein the at least two opposing walls defining the shape of the letter and having an open front; the at least two opposing walls having an inner surface and a forward end; a lens having a forward surface and an outer edge in the shape of the letter; a plurality of selectively positioned and oriented retention clips adjacent the forward end frictionally engaged with the enclosure walls; each clip includes an outwardly extending leg relative to the walls; a retainer cap against the forward surface of the lens for retaining the lens adjacent the enclosure and the walls; the retainer cap comprises an extrusion readily formable into a variety of shapes; the retainer cap includes an interior face having a first edge and an opposing second edge; the first edge having an overhang engaged to the forward surface of the lens; and, the second edge having channel, wherein the channel adapted to securely engage a plurality of the legs along an outer surface of the enclosure walls.

A channel sign assembly comprising an enclosure having at least two opposing walls, the at least two opposing walls defining the shape of the sign assembly and having an open front; the at least two opposing walls having an inner surface and a forward end; the walls including a plurality of intermittent retention clips mounted adjacent to the forward end; each clip, includes an outwardly extending leg relative to the walls; the legs are aligned with and offset from the forward end; a planar lens having a forward surface, and an outer edge in the defined shape of the sign and sized to fit within the at least two opposing walls of the enclosure; a retainer cap against the forward surface of the lens for retaining the lens within the enclosure and against the walls; the retainer cap comprises an extrusion readily formable into a variety of shapes; the retainer cap includes an interior face having a first edge and an opposing second edge; the first edge having an overhang engaged with the forward surface of the lens; and, the second edge forming a retention channel, wherein the channel adapted to securely engage a plurality of the legs along an outer surface of the enclosure walls.

A channel sign assembly comprising an enclosure having at least two opposing walls, the at least two opposing walls defining the shape of the sign assembly and having an open front; the at least two opposing walls forming a forward end; the walls including a plurality of intermittent retention clips mounted adjacent to the forward end; each clip mounted in a first orientation includes a first outwardly extending leg relative to the walls; the legs are aligned with and offset from the forward end; a planar lens having a forward surface and an outer edge in the defined shape of the sign; a retainer cap mounted against the forward surface of the lens for retaining the lens within the enclosure and against the walls; the retainer cap comprises an extrusion readily formable into a variety of shapes; the retainer cap includes an interior face having a first edge and an opposing second edge; the first edge having an overhang engaged with the forward surface of the lens; and, the second edge forming a retention channel, wherein the channel adapted to securely engage a plurality of the legs along an outer surface of the enclosure walls.

BRIEF DESCRIPTION OF THE DRAWINGS

A better and more complete understanding of the present invention will be had after a reading of the following detailed description taken in conjunction with the drawings wherein.

DETAILED DESCRIPTION

Figure 1:
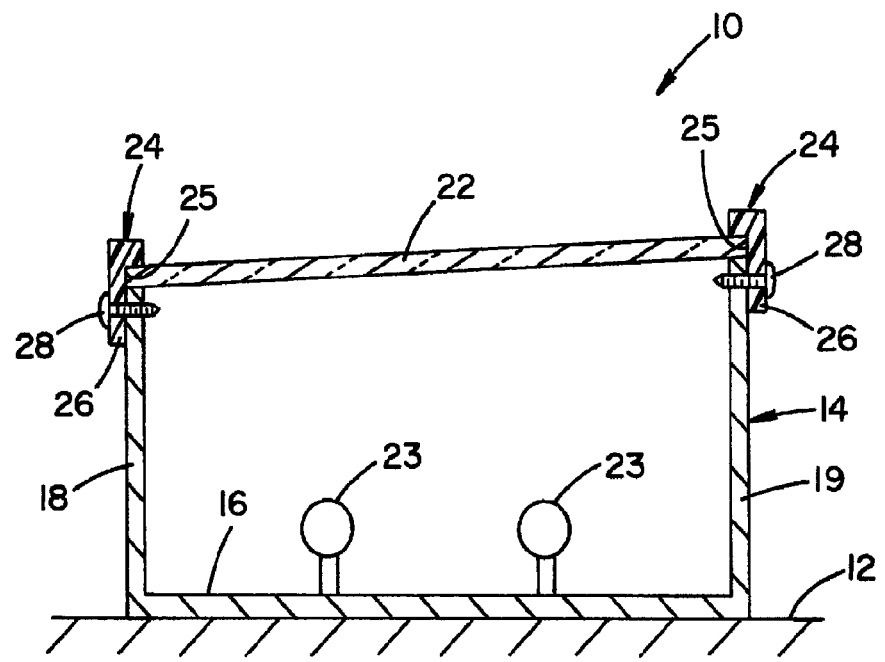
FIG. 1 is an enlarged cross sectional view of channel letter walls, lens, and trim cap assembly shown with screws retaining the trim cap to the walls of the enclosure as is known in the art.

Referring to FIG. 1, a channel letter assembly 10 according to the prior art is mounted on a supporting structure 12. As shown, the channel letter assembly 10 includes a metal enclosure 14 having a rear surface 16 and a plurality of side walls 18, 19 which are contoured to define the edges of a letter 10. The forward edges of the sidewalls 18, 19 define a plane and fitted across the forward edges is a transparent lens 22 having a shape corresponding to that defined by the walls 18, 19 of the enclosure 14. Retained to the rear surface 16 of the enclosure 14 is a light source 23, which can extend through the length of the channel letter 10 thereby illuminating the entire surface of the lens 22.

In accordance with the prior art, the lens 22 is retained to the side walls 18, 19 of the enclosure 14 by a trim cap 24. The trim cap 24 typically includes a plastic border member which can be glued, welded, or secured 25 to the outer edges of the lens 22. The trim cap 24 has a rearwardly extending lip 26 that fits over the forward edges of the side walls 18, 19. The trim cap 24 and the lens 22 are retained to the enclosure member 14 by a plurality of screws 28. The screws 28 pass through the trim cap's rearwardly extending lip 26 and screw into the sheet metal side walls 18, 19 of the enclosure 14.

The manufacture of a channel letter 10 in accordance with the prior art requires the construction of the enclosure 14, the manufacture of light fixtures 23 and the lens 22. Manufacture of the lens 22 requires cutting a transparent acrylic or plastic material into the shape of the channel letter 10 and attaching the trim cap 24 around the edges thereof. The trim cap 24 is then secured to the edges of the lens 22 via screws 28. The trim cap 24 is intended to meet the present sealing standards set by Underwriters Laboratories, but such standards may not be needed (or may result in different standards) for channel letters which employ the new LED technology. It would, therefore, be desirable to provide a less expensive and less cumbersome method of attaching a lens 22 to the enclosure of the channel letter 10. In addition, it would be desirable to provide a method that facilitates disassembly of the trim cap 24 and lens 22 from the enclosure for maintenance of the light fixture 23, and other components, within the enclosure.

Trim cap 24 can come in rolls and may be cut to any length. It can essentially be shaped to any configuration or size and is used to trim Plexiglas® letters or shapes (i.e. lens 22) by chemically welding the trim cap 24 to the plastic shapes 22. The letters or shapes 22 can then be placed on a channel which can contain neon or LED lighting to illuminate the letters or shapes. The result is a three-dimensional illuminated letter or shape. As discussed above, prior attachment means for securing the trim cap 24 to the outside of the metal channel 18, 19 comprise holes drilled through the trim cap 24 and the metal channel 18, 19 followed by screws 28 driven through the trim cap 24 into the metallic channel 18, 19 (i.e. for securing the trim cap thereto).

The use of screws is undesirable for a number of reasons. Screws are not aesthetically acceptable and they create depressions in the trim cap 24. Although not shown, the screws 28 peel when painted to match the trim cap 24 and can rust and freeze making it difficult to remove for servicing the sign assembly. The screws 28 cause staining (i.e. rust streaks along the walls 18, 19) and often crack the trim cap 24. Thus, there is a need for an improved system for assembling trim cap letters and numbers to a supporting channel.

Figure 6A:
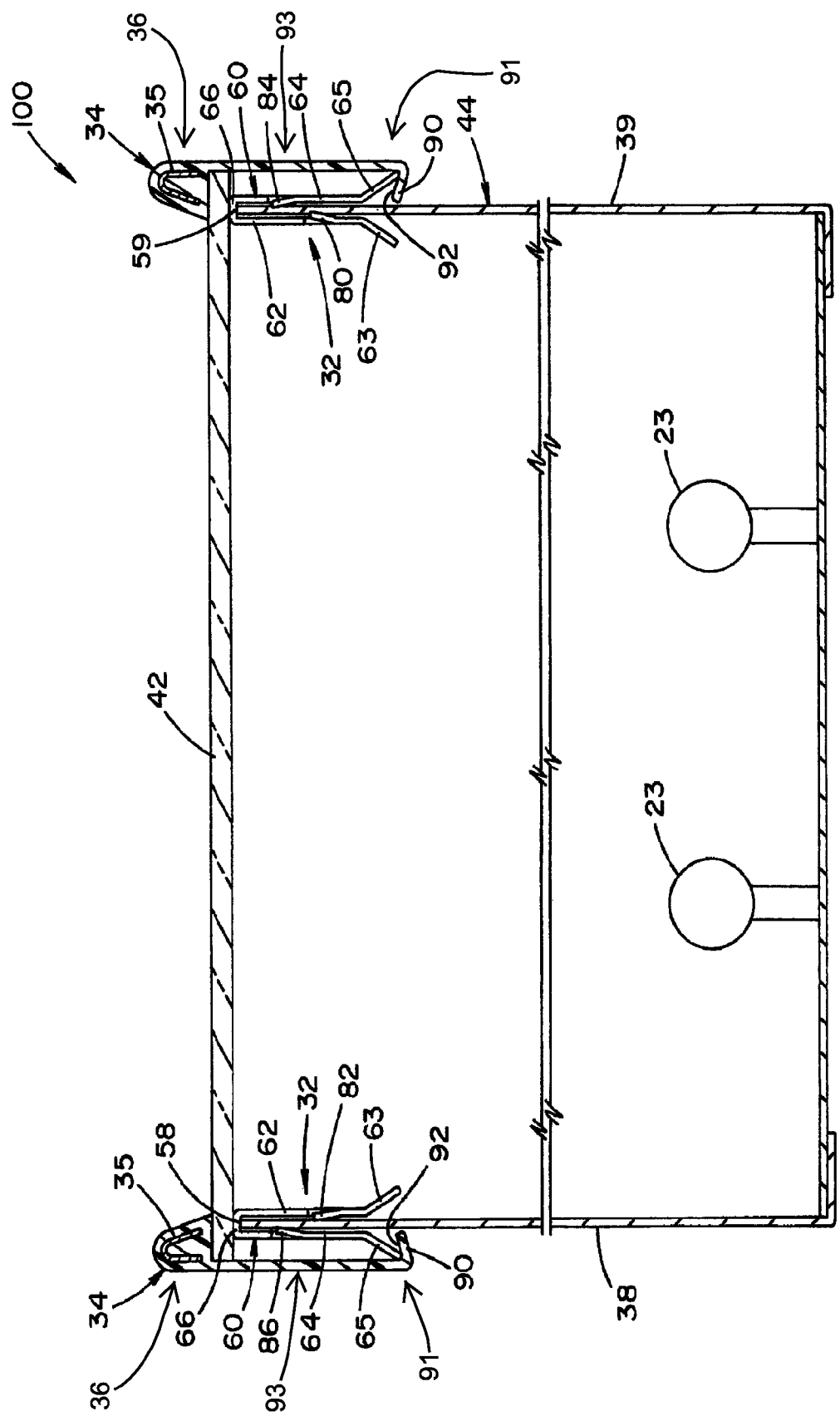
FIG. 6A is a cross sectional view of the channel letter assembly employing the retainer clip in accordance with the present invention and a first embodiment of trim cap.
Figure 6B:
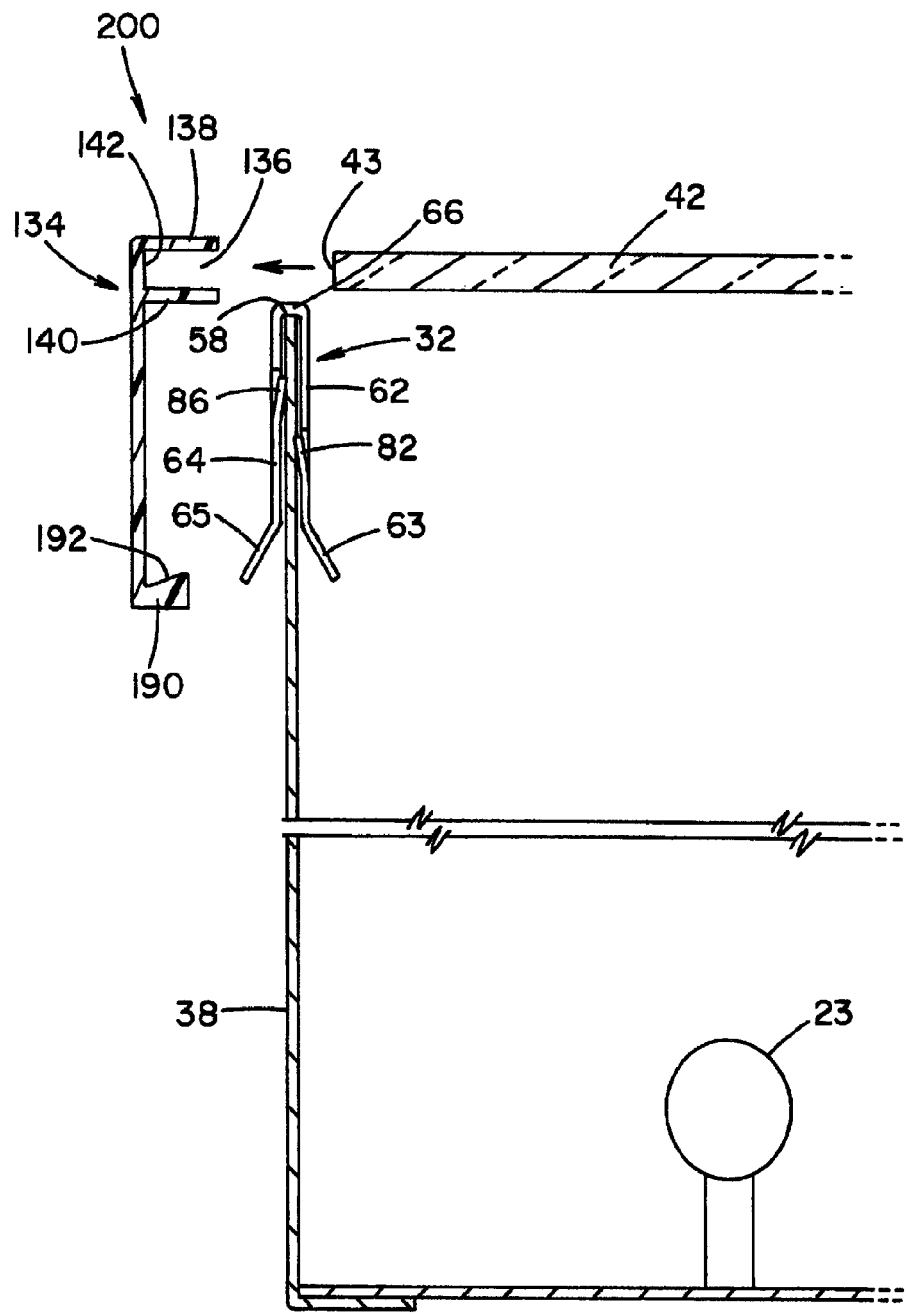
FIG. 6B is a cross section view of the letter assembly employing the retainer clip in accordance with the present invention and a second embodiment of trim cap.
Figure 7:
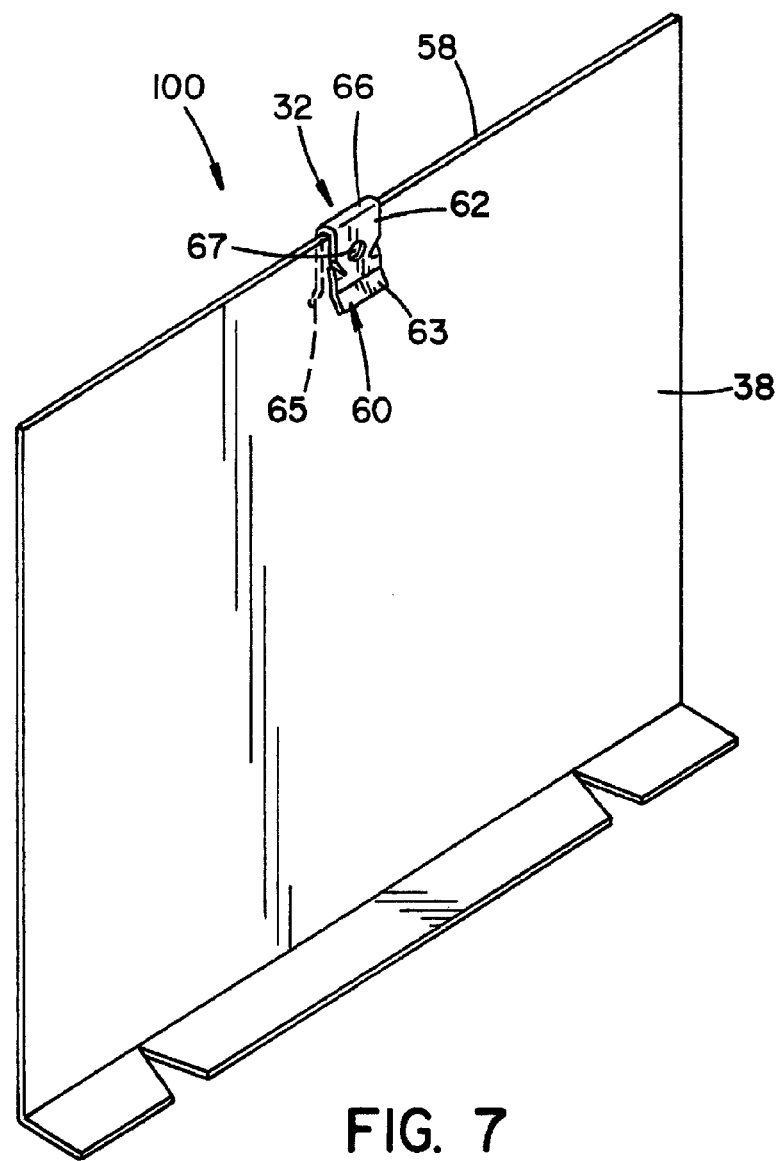
FIG. 7 is a perspective view of a side wall of an enclosure with a retainer clip mounted thereon; and, FIG. 8 is a perspective view of a side wall of an enclosure with the retainer clip mounted thereon along with the trim cap mounted thereto and the lens positioned thereabove.
Figure 8:
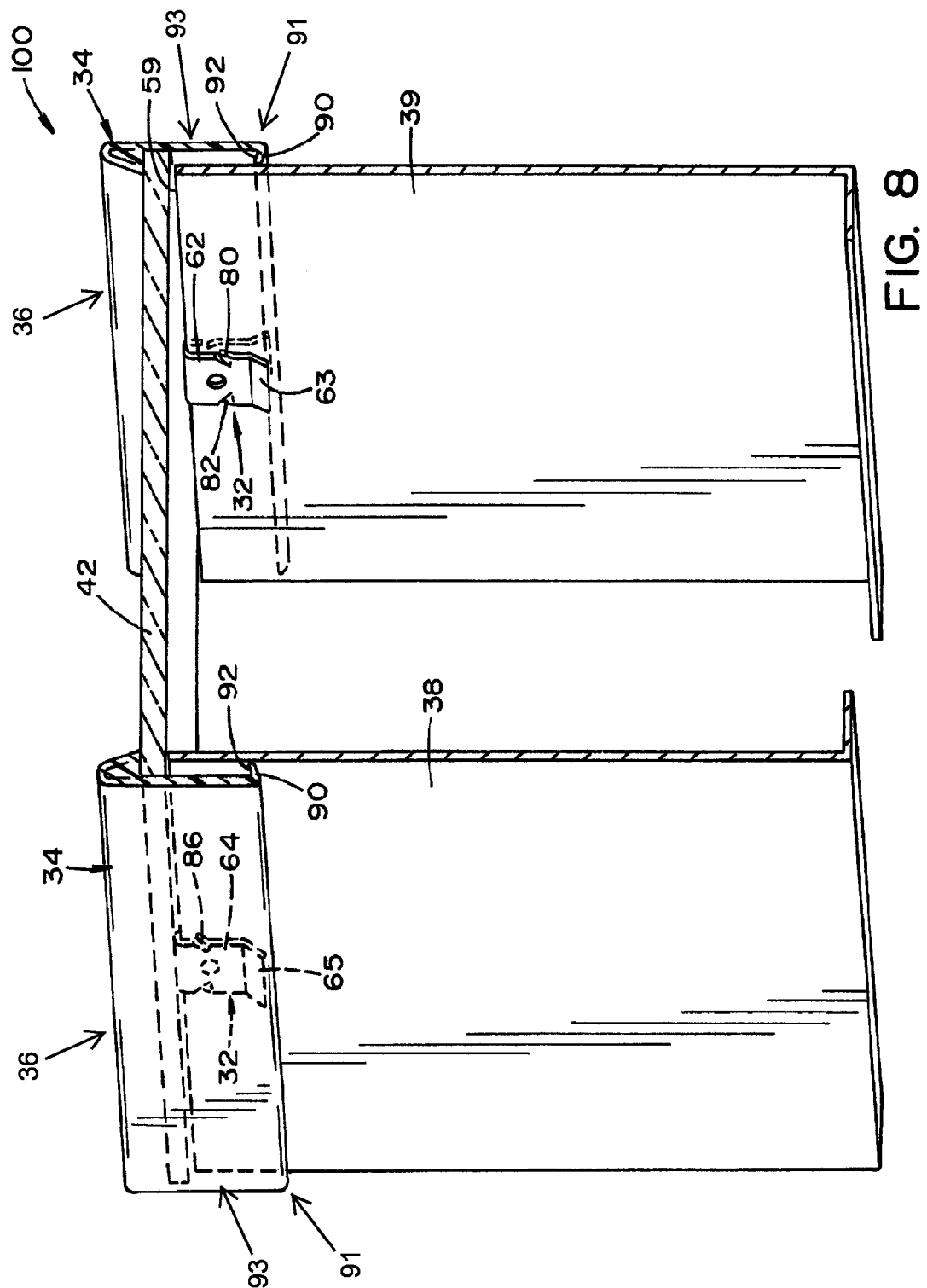

Referring to FIGS. 2-8, and in accordance with the present disclosure, a channel letter assembly 100 having a retaining clip 32 is therein displayed. The clip 32 provides a means for securing a trim cap or retainer cap 34 to the walls 38, 39 of the enclosure 44. Trim cap or retainer cap 34 may be manufactured by extrusion as an elongate member (FIG. 8), and may be readily formable into a variety of shapes. It is to be appreciated that trim cap 34 can include a metal insert 35 (i.e. aluminum) extending therethrough at an upper or forward edge portion 36 thereof, in order to provide rigidity and formability to the trim cap 34 shape. The metal insert 35 can be positioned adjacent to an exterior side or imbedded within the interior of trim cap 34. The insert 35 can extend through a portion of trim cap 34, such as at upper or forward edge portion 36 as shown in FIGS. 6A and 8, or through substantially the entire cross section of trim cap 34. To facilitate retention of a lens 42 against the front edges 58, 59 of the walls 38, 39 of the enclosure 44, a plurality of the retainer clips 32 are spaced along the front edges or terminal ends 58, 59 of the walls 38, 39 of the enclosure 44. Each of the retainer clips 32 can comprise a unitary generally u-shaped rigid body 60 having a first side 62, a second side 64, and an arched back 66 connecting the two sides 62, 64. Each of the sides 62, 64 includes a leg 63, 65 extending therefrom. The legs 63, 65 extend in a y-shape relative to each other and sides 62, 64. The legs 62, 65 form an enlarged receiving opening 70 for placement of the clip 32 onto the terminal ends 58, 59 of the side walls 38, 39 of the enclosure 44. The legs 63, 65 are spaced from each other at a first end and form a first spaced distance 72 that is significantly greater than the given thickness of the sheet metal of the walls. The legs 63, 65 taper towards each other at a second end to form a second spaced distance 74 that is slightly greater than the thickness of the sheet metal of the walls. A plurality of rigid barbs 80, 82, 84, 86 extend from the inner surface of the sides 62, 64, of the u-shaped body 60, and into the space between the first side 62 and the second side 64. In one embodiment, the barbs 80, 82, 84, 86 are crimped from the edges of both sides of the body 60. The number and spacing of the barbs can vary. In one arrangement, barbs 80, 82 are formed from a left edge and a right edge of the first side 62; and, barbs 84, 86 are formed from a left edge and a right edge of the second side 64. The body, legs, and barbs of the retainer clip 32 can be made from metal (i.e. stainless steel). The barbs 80, 82, 84, 86 can be arranged such that they are not perpendicular to the sides 62, 64 of the u-shaped body 60 from which they project, but are oriented at an angle with respect to the perpendicular with a component of the angle extending toward the arched back 66. The angled orientation of the barbs 80, 82, 84, 86 permit the clip 32 to be easily fitted over the terminal ends 58, 59 of the side walls 38, 39 of the enclosure 44 but resist removal of the retainer clip 32 once it has been installed. A plurality of such retainer clips 32 can be positioned around the outer edge of the walls thereby providing an attachment means for the trim cap 34 and lens 42 to the walls 38, 39 of the enclosure 44. Retaining the trim cap 34 to the walls 38, 39 of the enclosure in turn provides the means for securing the lens 42 to the enclosure walls 38, 39 thereby providing a water resistant cover to the interior of the enclosure 44.

Figure 2:
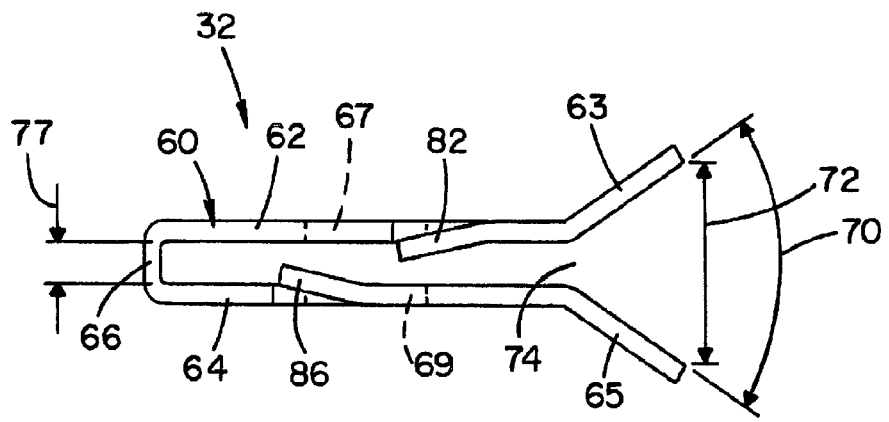
FIG. 2 is an edge view of the retainer clip.
Figure 3:
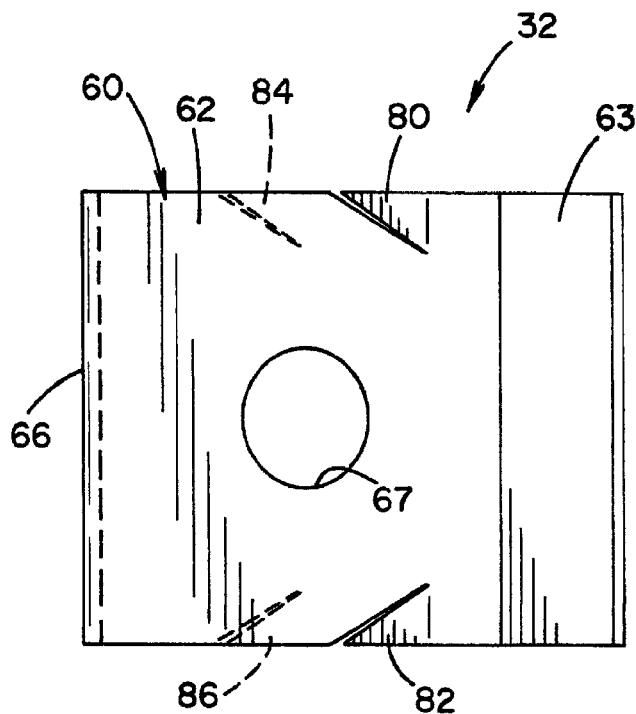
FIG. 3 is a front side view of the retainer clip.
Figure 4:
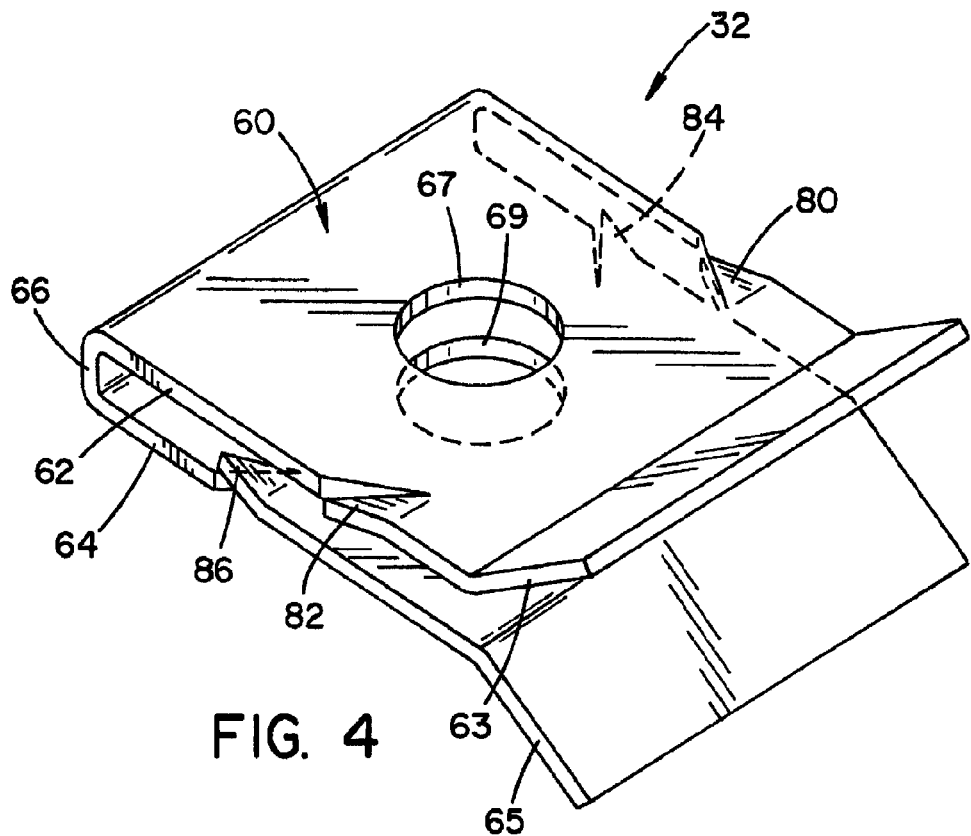
FIG. 4 is a perspective view of the retainer clip.
Figure 5:
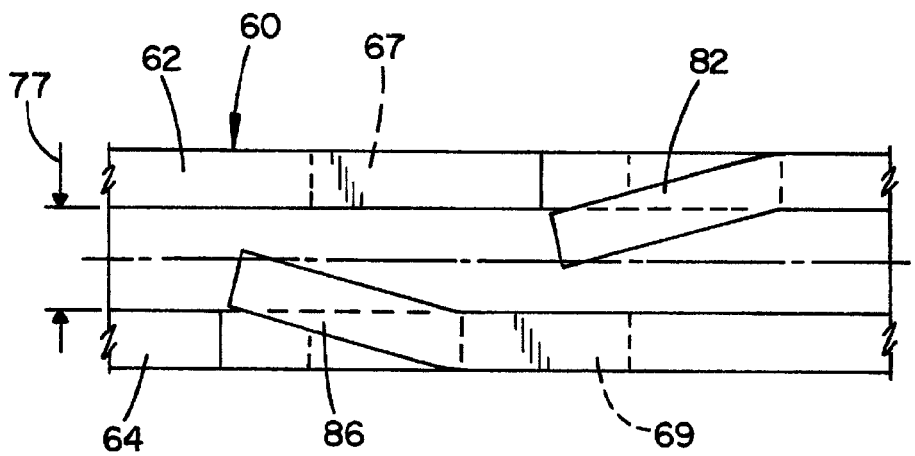
FIG. 5 is an enlarged partial edge view of the retainer clip.

As best shown in FIGS. 2 and 5, the barbs 80, 82, 84, 86 may be positioned on either or both of the sides 62, 64 and can extend at least half the distance, or substantially half the distance 77, between the sides 62, 64. It should be appreciated that the walls of an enclosure for a small channel letter can be made of a thinner gauge of metal than the walls of a larger channel letter, and therefore the spacing between the legs of a retainer clip can be made to accept more than one gauge of metal. It should also be appreciated that the retainer clips 32 may be manufactured in more than one size to provide desirable fitting between the sides and clips in order to accommodate a variety of wall thicknesses (and materials), and a variety of trim cap sizes. It is to be appreciated that the channel enclosure can be made from non-metal materials (i.e. rigid or semi-rigid plastics). Non-metal materials can be used in conjunction with clips 32 discussed herein.

Referring to FIGS. 6A, 6B, 7 and 8, the retainer clip 32 is fitted on the forward end 58 of a wall 38 with the second or exterior leg 65 extending outward away from the wall 38. The retaining clip 32 can be easily installed because the barbs 80, 82, 84, 86 and sides 62, 64 will readily flex as the sides 62, 64 are moved along the opposing surfaces of the wall 38 until the forward end 58 of the wall 38 is against the arched back 66 of the clip 32 as shown. When all the retainer clips 32 have been installed along the walls 38, 39 of the enclosure 44 the lens 42 can be positioned to rest on the outer surface of the arched backs 66 of the clips 32. Referring to the figures, it is to be appreciated that after a retainer clip 32 has been installed, the angularly oriented barbs 80, 82, 84, 86 will resist removal of the retainer clip 32. This is because friction between the surfaces of the wall 38, 39 and the free end of the barbs 80, 82, 84, 86 will wedge the barbs between (and into) the surface of the wall 38, 39 and the associated side so that retainer clip 32 secures itself to a respective wall 38, 39 and is thus a self-securing retainer clip.

The retainer clip 32 is depicted as having two barbs 80, 82 extending from opposing edges of one side 62 and two barbs 84, 86 extending from opposing edges of the other side 64. It is to be appreciated that the barbs 80, 82, 84, 86 could be arranged in any number of configurations on the opposing sides 62, 64 of the retaining clip.

In accordance with the present invention, to retain the lens against the terminal ends of the shoulder a plurality of retainer clips are spaced along the outer end of the walls of the enclosure. Each of the retainer clips can comprise a unitary generally u-shaped rigid body having a first side, a second side, and an arched back connecting the two sides. Each of the sides includes a leg extending therefrom. The legs extend in a y-shape relative to each other. The legs form an enlarged receiving opening for placement of the clip onto a terminal or forward end of a side wall of the enclosure. The legs are spaced from each other at a first end and form a first spaced distance that is significantly greater than the given thickness of the sheet metal of the walls. The legs taper towards each other at a second end to form a second spaced distance that is slightly larger than the thickness of the side wall of the enclosure. A plurality of rigid barbs extends from the inner surface of the sides of the u-shaped body and into the space between the sides. In one embodiment, the barbs are crimped along edges of both sides of the body. The number and spacing of the barbs can vary. In one arrangement, barbs are formed from a left edge and a right edge of the first side; and, formed from a left edge and a right edge of the second side. The body, legs, and barbs of the retainer clip can be made from rigid metal (i.e. stainless steel). Also, the barbs are not perpendicular to the sides of the u-shaped body from which they project, but are at an angle with respect to the perpendicular with a component of the angle extending toward the arched back. The angled orientation of the barbs permit the clip, using one-handed pressure, to be slid over the terminal or front ends of the side walls of the enclosure (in a first direction) but resist removal of the retainer clip once it has been installed (in a second opposing direction). It is to be appreciated that the rigid barbs 80, 82, 84, 86, can "bite" into relatively softer metal walls (i.e. aluminum) and non-metal walls as the clip 32 is slid over the ends of the walls 38, 39 of the enclosure 44 in the first direction. The "biting" of the barbs 80, 82, 84, 86 into the walls 38, 39, coupled with the angled orientation of the barbs, resists removal of the clip 32 when moved in a second direction opposed to the first direction. To further secure the clips 32 to the enclosure walls 38, 39, a rivet or similar (not illustrated) can be installed through the aligned openings 67, 69 in the sides 62, 64 of the clips 32 and through a corresponding wall 38, 39. A plurality of such retainer clips can be positioned around the front edge of the walls thereby providing an attachment means for the trim cap to the walls of the enclosure. Retaining the trim cap (in place) in turn provides the means for securing the lens to the enclosure walls.

Referring to FIG. 6A, the channel sign assembly 32 in accordance with the present disclosure, including a first embodiment of trim cap 34, is therein displayed. The assembly includes a metal enclosure 44 having a plurality of sheet metal side walls 38, 39. The retainer, snap cap, or trim cap 34 can be attached, i.e. firmly glued to the lens 42. The lens 42 and retainer cap 34 provide lateral support to the walls 38, 39. The lens 42 and the retainer cap 34 prevent the walls 38, 39 from moving towards each other and from bowing outward away from each other.

The clips 32, once installed, provide a tab or leg 65 that extends outward away from the walls 38, 39 of the channel and can engage a foot 90 of the retainer cap (i.e. in a 'snap cap' or friction engagement arrangement) at a rearward or bottom end portion 91 of elongate retainer cap 34, with a generally planar middle portion 93 of the retainer cap 34 extending between upper or forward edge portion 36 and rearward or bottom end portion 91 thereof. The foot 90 can extend in a length from about ¼ inch to about 1¼ inches. The foot 90 of the retainer cap 34 can be in the form of an angled receiver or retention channel having a face 92 angled upward from about 3 degrees to about 9 degrees from horizontal. In one arrangement, the receiver can be angled upward from about 5 degrees to about 7 degrees from horizontal.

The clips 32 can be placed onto the channel walls 38, 39 at random positions around the letter or shape at the discretion of an installer. The number and intermittent spacing of the clips 32 will be dependent upon the size and design of the channel sign. The interlocking effect of the foot 90 of the retainer cap 34 to the tabs 65 will enable secure attachment of the plastic lens 42 and retainer cap 34 to the metallic channel 38, 39.

The tabs 65 of the clips 32 can be positioned such that they are aligned with and proximal to the front edge 58 59 of the side walls 38, 39. The friction "locking" effect of the barbs enables a positive engagement of the inside faces of the clip 32 to the forward edge and forward side portions of the metallic channel 38, 39.

FIG. 6B shows a cross-sectional view of the clip 32 as it would be aligned with the front edge of the side walls in conjunction with a second embodiment of trim cap 134. Trim cap 134, or channel letter assembly 200, includes a slot 136 for receiving the edge 43 or lens 42. The slot 136 includes an upper leg 138, a lower leg 140, and a back edge 142. The trim cap 134 further includes a foot 190 for engaging leg 65 of clip 32. The foot 190 can be in the form of an angled receiver or retention channel having an angled face 192. The angled face 192 can be from above 3 degrees to about 9 degrees from horizontal. The angled face 192 and foot 190 provide a "snap fit" with leg 65 thereby securing trim cap 134 to clip 32, wall 38, and lens 42.

FIGS. 7 and 8 show perspective views of the clip 32 as mounted to the side walls 38, 39.

In furtherance of the above described retainer cap 34, 134, a simple lever tool (i.e. two-pronged) angled lever can be used to facilitate the detachment or removal of the plastic retainer or snap cap from the walls (i.e. metallic or non-metallic). The retainer cap 34, 134 can be detached from the clips 32 using this separate tool which can be manually lever driven. The lever tool can release the retainer cap 34, 134 much as a bottle opener locks under a lid to pop the lid off using a lever action.

When a channel sign assembly 100, 200 is assembled using the clips 32 as described, the finished product will present a more attractive appearance than one assembled using screws. In addition, when it is time to service the sign assembly to replace LEDs, or other devices, the snap/retainer cap 34, 134 can be pried off using the simple lever device. The lever device can reach between the retainer cap and the side wall 38, 39 and then pull the receiver edge 92, 192 of the retainer cap 34, 134 respectively, outward in order to free the edge 92, 192 from the terminal end of the outward side 65 of the clip 32. This prying process can be continued for several clips 32 which will enable the service technician to free the entire perimeter, or a desired portion thereof, of the retainer cap 34, 134 from the forward end 58, 59 of the channel sign enclosure 44 without the use of a screwdriver and the cumbersome removal of screws.

While embodiments of the present disclosure have been disclosed, it will be appreciated that many modifications or variations may be made without departing from the true spirit and scope of the disclosure. It is, therefore, the intent of the pending claims to cover all such variations and modifications which fall within the true spirit and scope of the disclosure.

What is claimed:

1. A sign lens securing system ad apted to be used with a channel sign assembly, the channel sign assembly having wall portions cooperating with a lens to define an enclosure, said lens securing system comprising:
a plurality of retention clips configured to be positioned in spaced arrangement along forward ends of the wall portions, each of said retention clips comprising first and second side portions joined together by a back, and a leg that extends outwardly from one of said first and second side portions;
wherein said first and second side portions of said retention clips are configured to be positioned along respective opposite sides of the wall portions with said backs positioned proximate a forward edge of the wall portions and said legs extending outwardly from an outboard side of the wall portions; and
a retainer cap having a forward edge portion configured to engage a perimeter edge region of the lens and a rearward end portion configured to engage said legs of said retention clips, said forward end portion comprising an overhang configured to engage a forward surface of the lens and said rearward end portion defining a channel for receiving said legs.

2. The sign lens securing system of claim 1, wherein said retention clips comprise self-securing retention clips configured to frictionally engage the wall portions.

3. The sign lens securing system of claim 2, wherein each of said retention clips comprises a generally U-shaped body, and wherein at least one of said first and second side portions includes a plurality of barbs extending inwardly for frictional engagement with one of the wall portions.

4. The sign lens securing system of claim 3, wherein said barbs are oriented to facilitate mounting said retention clips to the wall portion in a first direction while resisting dismounting from the wall portion in a second direction.

5. The sign lens securing system of claim 4, wherein respective ones of said barbs are arranged along each of said first and second side portions of said retention clips.

6. The sign lens securing system of claim 1, wherein each of said retention clips comprises a unitary body including said first and second side portions, said back, and said leg, said first and second side portions each including at least one barb of substantially rigid material, and wherein said at least one barb of said first side and said at least one barb of said second side are spaced from each other by a distance less than a thickness of the wall portions prior to mounting said retention clips.

7. The sign lens securing system of claim 6, wherein each of said first and second side portions of said retention clips comprises a respective one of said legs, whereby said retention clips are configured for mounting with either of said first and second side portions positioned along the outboard side of the wall portions.

8. The sign lens securing system of claim 1, wherein said retainer cap is an elongate retainer cap of partially flexible material and configured to be cut to a desired length.

9. The sign lens securing system of claim 1, further in combination with a channel sign assembly, said channel sign assembly comprising wall portions and a lens, wherein said lens is configured to cooperate with said wall portions to define an enclosure.

10. A sign lens securing system adapted to be used with a channel sign assembly, the channel sign assembly having wall portions cooperating with a lens to define an enclosure, said lens securing system comprising:
a plurality of self-securing retention clips configured to be positioned in spaced arrangement along edges of the wall portions, each of said retention clips comprising at least one side portion and a leg that extends outwardly from said side portion;

a securing element at each of said side portions, wherein said securing element is configured to engage the wall portions so as to resist dismounting said retention clip from the wall portions;

an elongate retainer cap having a forward edge portion defining an overhang configured to engage a perimeter edge region of the lens, and an opposing rearward end portion comprising an angled receiver configured to engage said legs of said plurality of self-securing retention clips;

wherein said retainer cap is configured for mounting along the perimeter edge region of the lens and along the edges of the wall portions for retaining the lens at the wall portions.

11. The sign lens securing system of claim 10, wherein said overhang is configured to engage a forward surface of the lens at the perimeter edge region thereof.

12. The sign lens securing system of claim 11, wherein said angled receiver of said elongate retainer cap is angled by about 3 degrees to about 9 degrees forward of perpendicular to the wall portion.

13. The sign lens securing system of claim 10, wherein said elongate retainer cap comprises a middle portion disposed between said forward and rearward end portions, and wherein said angled receiver cooperates with said middle portion to define a channel in which said legs are received.

14. The sign lens securing system of claim 10, wherein each of said retention clips comprises a generally U-shaped body having two side portions configured to extend, respectively, along inboard and outboard side surfaces of one of the wall portions, and wherein said securing element is configured to frictionally engage the wall portion.

15. The sign lens securing system of claim 14, wherein said securing element comprises an inwardly-directed barb along each of said side portions, and wherein said barbs are oriented to facilitate mounting said retention clips to the wall portion in a first direction while resisting removal of said retention clips from the wall portion in a second direction.

16. The sign lens securing system of claim 10, wherein each of said retention clips comprises a unitary body having first and second side portions, each of said side portions extending from a back that is configured to be disposed around a forward edge of the wall portion, each of said side portions including at least one of said securing members comprising a barb of substantially rigid material, wherein said barb of said first side portion and said barb of said second side portion are spaced from each other by a distance less than a thickness of the wall portion prior to mounting said retention clip.

17. The sign lens securing system of claim 16, wherein each of said first and second side portions of said retention clips comprises one of said legs, and wherein said retention clips are configured for mounting with either of said first and second side portions positioned along an outboard side surface of the one of the wall portions.

18. The sign lens securing system of claim 17, wherein said retainer cap comprises an extrusion that readily formable into a variety of shapes corresponding to at least a portion of said sign assembly.

19. The sign lens securing system of claim 10, further in combination with a channel sign assembly, said channel sign assembly comprising wall portions and a lens, wherein said lens is configured to cooperate with said wall portions to define an enclosure.

20. A method of securing a sign lens of a channel sign assembly, said method comprising:

attaching a plurality of retention clips in spaced arrangement along a forward end of a wall portion, each of said retention clips having first and second side portions joined together by a back, and a leg that extends outwardly from one of said first and second side portions;

positioning a lens at the forward end of the wall portion, the lens having a forward surface and an outer perimeter region generally in the shape of the wall portion;

positioning an overhanging forward edge portion of an elongate retainer cap along the forward surface of the lens along the outer perimeter region thereof; and positioning a rearward end portion of the elongate retainer cap around the legs of the retention clips, whereby the legs are received in a channel defined by the rearward end portion of the elongate retainer cap to thereby secure the lens to the wall portion.

21. An elongate signage retainer cap adapted to be used with a channel sign assembly, the channel sign assembly having wall portions and a lens defining an enclosure, said retainer cap comprising:

a forward edge portion including an overhang configured to engage a perimeter edge region of a lens;

a generally planar middle portion disposed adjacent said forward end portion, said middle portion having an inner surface configured to face a wall portion of a channel sign assembly;

a rearward end portion having an angled receiver defining a channel for receiving outwardly extending legs of a plurality of retention clips positioned along wall portions of the channel sign assembly; and wherein said angled receiver comprises a face set at an acute angle relative to said inner surface of said middle portion.

22. The elongate signage retainer cap of claim 21, wherein said face of said angled receiver is angled by about 3 degrees to about 9 degrees forward of perpendicular to said inner surface of said middle portion.

* * * * *